R. S. SMITH.
ELECTRIC HEATED STEERING WHEEL.
APPLICATION FILED JAN. 21, 1913.
1,082,830.  Patented Dec. 30, 1913.
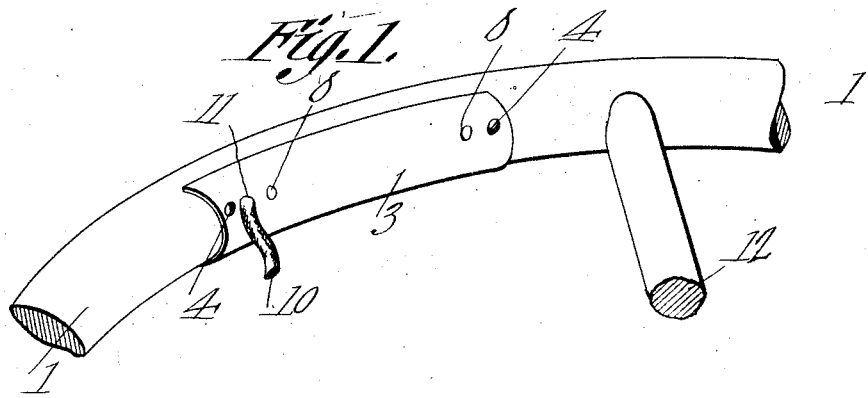
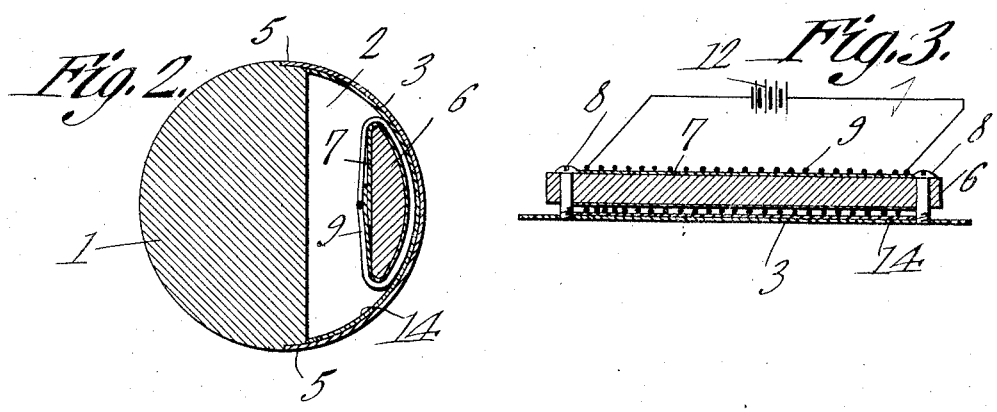
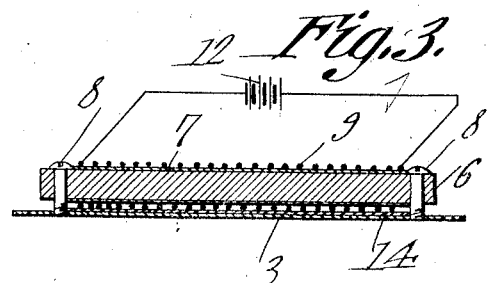
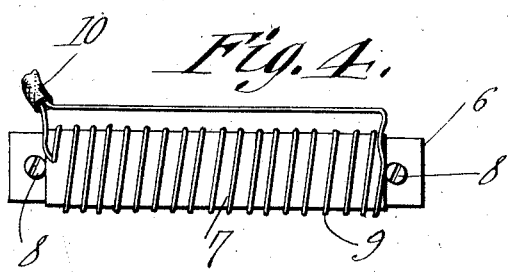
Witnesses
Reuben S. Smith
Inventor
by C. A. Snow & Co.
Attorneys

UNITED STATES PATENT OFFICE.

REUBEN S. SMITH, OF MARSHALL, TEXAS.

ELECTRIC-HEATED STEERING-WHEEL.

1,082,830.

Specification of Letters Patent. Patented Dec. 30, 1913.

Application filed January 21, 1913. Serial No. 743,366.

*To all whom it may concern:*

Be it known that I, REUBEN S. SMITH, a citizen of the United States, residing at Marshall, in the county of Harrison and State of Texas, have invented a new and useful Electric-Heated Steering-Wheel, of which the following is a specification.

One object of the present invention is to provide a novel form of heating member which may be assembled readily with a steering element, such as the steering wheel of an automobile, the construction being such that the heating element is housed, without materially changing the standard form of the steering wheel and without mutilating the steering wheel to an undesirable extent.

Another object of the invention is to provide novel means for insulating and for connecting operatively, the several constituent elements of the structure.

It is within the scope of the invention to improve generally and to enhance the utility of, devices of that type to which the present invention appertains.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawing:—Figure 1 shows the invention in perspective, applied to a portion of a steering wheel; Fig. 2 is a transverse section of the steering wheel, showing the heating member assembled therewith; Fig. 3 is a fragmental longitudinal section of the heating member, the heating circuit being shown diagrammatically; and Fig. 4 is a plan of that portion of the device which is shown in Fig. 3.

In the drawing, the numeral 1 indicates generally a steering member which may be the steering wheel of an automobile, a motor boat or like vehicle. In the inner face of the steering member 1 is fashioned a recess 2. Extended across the recess is a closure 3, of trough-shaped form, the closure 3 being fashioned from metal, porcelain, or any other suitable material. The ends of the closure 3 extend beyond the ends of the recess 2 and screws 4 or other securing elements pass through the ends of the closure 3 and engage the steering member 1 beyond the ends of the recess 2. As indicated at 5, the longitudinal edges of the closure 3 overlap the steering member 1 beyond the longitudinal edges of the recess 2, thereby completely closing the recess.

The device further includes a core 6 which ordinarily is fashioned from metal, and is adapted to store the heat generated by the resistance coil hereinafter described. The core 6 ordinarily is flattened upon one side, so as to lie parallel with the base of the recess 2, the other side of the core 6 being curved to conform to the curvature of the closure 3.

Wrapped about the core 6 is a covering 7 which is fashioned from mica or from some other material which, being a conductor of heat, is at the same time, an electrical insulator. Screws 8 or the like pass through the ends of the core 6 and engage the closure 3. The screws 8 constitute means for preventing the covering 7 from moving endwise on the core 6. Wound about the covering 7 is a resistance coil 9 which may be made of German silver wire, the ends of the coil merging into a cable 10 which passes outwardly through an opening 11 in one end of the closure 3. The ends of the resistance coil 9 are connected with opposite sides of a source of electrical current, indicated diagrammatically at 12 in Fig. 3. A lining 14, preferably taking the form of a sheet of mica or other material having similar properties is interposed between the resistance coil 9 and the closure 3. This lining 14 serves to insulate the resistance coil 9 from the closure 3, a condition which is desirable when the closure 3 is fashioned from conducting material. The lining 14 lies between the screws 8, and end-wise movement of the lining is prevented by means of the screws. The lining is extended transversely of the steering member, 1, to a point adjacent the base of the recess 2, as shown in Fig. 2. Owing to this fact, the ends of the resistance coil 9, when bare, will be prevented from coming into electrical contact with the closure 3, and therefore, the closure, when of conducting material, cannot be charged accidentally from the resistance coil.

Although the heating unit is shown in the form of a coil, it will be understood that the unit may be of any form adapted for use in the combination shown and for the purposes set forth.

Having thus described the invention, what is claimed is:—

1. In a device of the class described, a steering member having a superficial recess; a closure for the recess; an electrical heating unit carried by the closure; and means for securing the closure to the steering member.

2. In a device of the class described, a steering member having a superficial recess; a closure for the recess; an electrical heating unit secured to the closure; means for securing the closure to the steering member; and an insulating element lying between the heating unit and the closure, the edges of the insulating element lying close to the base of the recess.

In testimony that I claim the foregoing as my own, I have hereto affixed my signature in the presence of two witnesses.

REUBEN S. SMITH.

Witnesses:
W. T. COCK,
LEE FISHER.